US008977286B2

(12) United States Patent
Schmitt et al.

(10) Patent No.: US 8,977,286 B2
(45) Date of Patent: Mar. 10, 2015

(54) PROCESS FOR UPDATING ADDITIONAL INFORMATION STORED IN A TERMINAL FOR A TERMINAL-BASED RECOGNITION OF HOME BASE STATIONS IN A CELLULAR LAND MOBILE SYSTEM

(75) Inventors: Harald Schmitt, Bendorf (DE); Axel Klatt, Cologne (DE)

(73) Assignee: Deutsche Telekom AG, Bonn (DE)

( * ) Notice: Subject to any disclaimer, the term of this patent is extended or adjusted under 35 U.S.C. 154(b) by 818 days.

(21) Appl. No.: 13/129,064

(22) PCT Filed: Dec. 15, 2009

(86) PCT No.: PCT/EP2009/008988
§ 371 (c)(1),
(2), (4) Date: May 19, 2011

(87) PCT Pub. No.: WO2010/078920
PCT Pub. Date: Jul. 15, 2010

(65) Prior Publication Data
US 2012/0009940 A1    Jan. 12, 2012

(30) Foreign Application Priority Data

Jan. 8, 2009   (DE) .................. 10 2009 004 358

(51) Int. Cl.
*H04W 48/16* (2009.01)
*H04W 24/02* (2009.01)
*H04W 60/04* (2009.01)
*H04W 64/00* (2009.01)
*H04W 84/04* (2009.01)

(52) U.S. Cl.
CPC .............. *H04W 48/16* (2013.01); *H04W 24/02* (2013.01); *H04W 60/04* (2013.01); *H04W 64/003* (2013.01); *H04W 84/045* (2013.01)
USPC ...................................... 455/456.1

(58) Field of Classification Search
CPC ... H04W 60/00; H04W 60/04; H04W 64/003; H04W 84/045; H04W 24/02
USPC .......... 455/422.1, 426.1, 432.1, 435.1, 435.2, 455/444, 448, 456.1, 456.6
See application file for complete search history.

(56) References Cited

U.S. PATENT DOCUMENTS

| 7,613,444 B2 | 11/2009 | Lindqvist |
| 2006/0035636 A1* | 2/2006 | Pirila ................. 455/435.2 |
| 2007/0021126 A1 | 1/2007 | Nanda |
| 2008/0254798 A1* | 10/2008 | Power et al. ............ 455/436 |

FOREIGN PATENT DOCUMENTS

| WO | 0228124 A | 4/2002 |
| WO | 2008131591 A | 11/2008 |
| WO | 2008148348 A | 12/2008 |

* cited by examiner

Primary Examiner — Nizar Sivji
(74) Attorney, Agent, or Firm — Andrew Wilford

(57) ABSTRACT

Process for geographical location of a cellular terminal (101) within a cellular land mobile network (110) for finding a certain base station (100), each cell (102, 103, 104) of the land mobile network (110) an identifier sent [sic], the combination of the identifiers of the identifiers which have been received at a certain geographical position delivering a unique configuration (130, 140), the cellular terminal (101) being suited to storing these configurations (130, 140), when agreement of the current configuration (130, 140) with the configuration (130, 140) stored in the cellular terminal (101) is established a search of the cellular terminal (101) for the base station (100) being triggered, by means of the base station (100) the configuration (130, 140) being checked at the geographical position of the base station (100) and when the identifier of the cell (102, 103, 104) is modified, a new identifier and/or the new configuration (140) for transmission to the cellular terminal (101) being made available, and the new identifiers and/or the new configuration (140) being stored in the cellular terminal (101).

6 Claims, 1 Drawing Sheet

PROCESS FOR UPDATING ADDITIONAL INFORMATION STORED IN A TERMINAL FOR A TERMINAL-BASED RECOGNITION OF HOME BASE STATIONS IN A CELLULAR LAND MOBILE SYSTEM

CROSS REFERENCE TO RELATED APPLICATIONS

This application is the US national phase of PCT application PCT/EP2009/008988, filed 15 Dec. 2009, published 15 Jul. 2010 as 2010/078920, and claiming the priority of German patent application 102009004358.6 itself filed 8 Jan. 2009.

FIELD OF THE INVENTION

The invention relates to a process for geographical location of a cellular terminal within a cellular land mobile network for finding a certain base station, each cell of the land mobile network sending an identifier and being able to be identified on this identifier, and the combination of the identifiers of cells of the vicinity, which latter identifiers have been received at a certain geographical position, delivering a unique configuration, the geographic position of the base station having such a unique configuration, the cellular terminal being suited to receiving and processing these identifiers and to storing one or more identifiers and/or configurations, when agreement of the current configuration with a configuration stored in the cellular terminal is established a search of the cellular terminal for the base station being triggered.

BACKGROUND OF THE INVENTION

This invention relates especially to a process and an arrangement for updating additional information stored in the terminal for supporting a terminal-based search function of a cellular terminal in a land mobile system, for example according to the GERAN, UTRAN, E-UTRAN, cdma2000, UMB, WiMAX, etc. standard for finding a usable home base station. This additional information contains typically location information.

In cellular land mobile systems, at present approaches are being examined for economically bringing network capacity and coverage into regions that do not make available any or only little capacity of a public cellular land mobile system. One approach is the installation of so-called base stations or home base stations (also home BTS, home-BS, HBS, home-eNB, CSG cells etc. or hereinafter also generally called a base station). Conventionally home base stations are connected to the public land mobile system via xDSL. This yields cost advantages for the network operator that can be passed on to the actual holder of the home base stations.

One particularity of the home base stations is the establishment of home base stations that is not monitored by the remaining land mobile system. I.e., the network operator conventionally has no knowledge of the set-up location of the home base stations and is thus not able either to make available mechanisms in the public network for controlling the home base stations. For this purpose a terminal-based search function is used.

Another typical feature of this type of home BS is the fact that only a limited number of registered users is allowed access to this home BS. Public use of the home BS is technologically not precluded, but is assumed furthermore without limitation of the typical application of a home BS placed in a personal home, residence or a vacation home to which only a limited number of registered cellular customers of the land mobile network (PLMN) has access. It could be for example a family of four.

The following options can be regarded as the prior art with respect to access to the home BS:

Different Network Identifiers (Plmn Ids) within the Land Mobile System

The home BS uses a network identifier (PLMN BD) that is different from the public land mobile network. Only the registered users may use the home BS. For public users the use of the network identifier and thus of the home BS is prohibited.

The disadvantages of this option lie in that the number of PLMN EDs is highly limited and thus differentiation of several home BS requires additional solutions. Furthermore the power consumption of the terminals that are used by the registered users is increased accordingly since the periodic network search is set to a short interval; this is necessary to minimize the time interval from reaching the location of the home BS to actual use of the home BS. Other disadvantages of this option lie in the increased legal and administrative cost which the network operator must bear in order to take additional PLMN TD for example into existing contracts.

Normal Cell Changing without its Own Land Mobile Network Identifier

Another option for controlling access of a home BS is to use the normal mobility procedures within a network identifier. For this purpose the home BS must be integrated into the public land mobile network and the corresponding vicinity relationships such as between all other cells of the land mobile network to the public land mobile network must be set up. Control for changing between the public land mobile network and the home BS takes place by suitable parameterization of the cell reselection process. Furthermore public users on the home BS can be rejected.

One major disadvantage of this option is that the battery running time of the cellular terminals of the public users is adversely affected since they must often measure cells of the home base stations that are not to be used. Furthermore the effort for integration of many home BS into a public land mobile network is very complex. In addition this effort increases in excess proportion when mobility of the actual home BS is inherently allowed; for example the owner of the home BS changes this regularly between his vacation residence and his own home.

Storage of Cell Data of the Macro-Network in Order to Avoid Searching for Home BS Another option lies in storage of the cell identification or configuration, a so-called "cell fingerprint", in the cellular terminal. A cellular terminal stores cell information of several transmitting stations of the public land mobile network in the geographic location of its own home BS. The cellular terminal periodically compares the current network configuration of the public land mobile network with the stored "cell fingerprint". As soon as the cellular terminal establishes agreement, the cellular terminal is located in range of the home BS and the terminal searches for the latter. This process that is used according to the prior art is based on a statistical probability that within the cellular land mobile system (PLMN) this cell constellation is one-time (or there at least a very low probability of again finding exactly the same constellation at another geographical position within the land mobile network).

In the "cell fingerprint" method the major disadvantage can be seen in that the updating of the "cell fingerprint" can take place necessarily by changes of the cell configuration by the network operator, currently only manually by the terminal user, i.e. the cellular customer, but the cellular customer normally is not notified about the network reconfigurations of the cellular operator.

OBJECT OF THE INVENTION

The object of the invention is to make available a process that even when the identifier of the cell changes or when the identifier of an area in a cellular land mobile network changes reliably allows geographic location of the cellular terminal within the cellular land mobile network that for example can be used to find its own base station again, i.e. the home BS can be used by the cellar terminal.

SUMMARY OF THE INVENTION

This object is achieved according to the invention by a process for geographical location of a cellular terminal within a cellular land mobile network for finding a certain base station, each cell of the land mobile network an identifier being sent and being able to be identified on this identifier, and the combination of the identifiers of the identifiers of cells of the vicinity, these identifiers having been received at a certain geographical position, delivering a unique configuration, the geographical position of the base station having such a unique configuration, the cellular terminal being suitable for receiving and processing these identifiers and for storing one or more identifiers and/or configurations, when agreement of the current configuration with a configuration stored in the cellular terminal is established a search of the cellular terminal for the base station being triggered, it is especially advantageous that by means of the base station the configuration is checked at the geographical position of the base station and when the identifier of the cell is modified, from which a new configuration arises, a new identifier and/or a new configuration for transmission to the cellular terminal is made available, and the new identifiers and/or the new configuration in the cellular terminal is stored.

Geographical location means that using the configuration given at a certain position within the cellular land mobile network, a conclusion about this geographical position is possible with the required reliability since this configuration occurs one time within the land mobile network or however only occurs again in the network with a negligibly small probability.

The geographical position corresponds to its vicinity in the transmission range and the current configuration designates that configuration that results from the identifiers of the cell identifiers that can be received at the current position.

Preferably the configuration at the geographical position of the base station is checked at regular time intervals.

It can be ensured by regular checking that the current configuration is always available at the local geographic position of the base station.

Preferably on the side of the base station the complete local network configurations are transmitted to the terminals of the users of the home base station.

The new cell data established by the base station itself, i.e. one or more cell identifications and/or network configuration can be made available preferably in that a new identifier of a cell and/or a new configuration on the side of the base station is transmitted to the cellular terminal, especially that a message is generated and transmitted, especially in the form of a short message or text message or over a data channel.

For transmission in the form of a text message in particular the transmission of a short message (SMS—short message service) is possible.

Here the home BS can use a protocol between the home BS and public macro-network for transmission of the configuration changes of the macro-network by means of SMS or over data channels.

Alternatively or cumulatively for direct transmission of the new data to the cellular terminal a new identifier of a cell and/or a new configuration on the side of the base station can be transmitted to the land mobile network, on the network side the new configuration is made available and/or transmitted to the cellular terminal.

It is thus also possible to store the actual configuration data that identify the current position of the base station on the server or the like that is integrated into the land mobile network or that can be reached via the latter, for retrieval by means of the cellular terminal.

I.e. that the network configurations for finding a usable home base station are stored in the macro-network, are updated by the home base station and is made available for retrieval by a cellular terminal of a home base station user.

This procedure also allows the data stored in the cellular terminal to be checked at any time and if necessary correction or updating of the stored data.

By means of the process according to the invention, thus the stored network configuration, i.e. the stored "cell fingerprint", is automatically updated in the cellular terminal for the case in which the cell information is changed by the network operator.

This invention as an improvement of the prior art thus proposes network-side support of the search function of a cellular terminal that makes it possible for the cellular terminal, in spite of a change of the configuration of the macro-cell network, to implement an intelligent search function and still when the macro-cell network changes in the geographical vicinity of the location of the home base to guarantee that its own home BS can be reliably found again.

The prerequisite for use of the proposed process according to the invention is the use of cell information of the cellular land mobile system (macro-cells) for intelligent support of the search function.

The major disadvantage of the prior art is that a change of the configuration of the macro-cell network in the vicinity of the location of the home BS will not initiate the search for the home BS because the "cell fingerprint" used for the search is not found. This disadvantage is overcome by the process according to the invention since the altered cell identifications and/or configurations are automatically updated.

In the process according to the invention for updating of network configurations of a macro-cell network that are stored locally in the terminal for supporting an optimized terminal-based search function of a cellular terminal in a cellular land mobile system, for example according to the GERAN, UTRAN, E-UTRAN, LTE A, cdma2000, UMB, WiMAX, etc. standard for finding a usable home base station, the configuration changes of the public macro-network are thus automatically recognized by the home base station and this configuration change is transmitted to the terminals of the users of the home base station.

Preferably only altered network parameters are transmitted by the home BS to the terminals of the users of the home base station.

It is advantageous if the identifier of the cell has a cell identification and a tracking area identification. When the cell identification and/or the tracking area identification is modified this is ascertained and made available to the cellular terminal.

Preferably the identifiers transmitted to the cellular terminal and/or the transmitted configuration has additional geographical information.

In particular, additional information that is made available by the cellular land mobile network can comprise geographical information.

It is advantageous if the new identifier of a cell and/or a new configuration is transmitted to the cellular terminal by means of a cellular terminal that has been integrated into the base station.

This means that in this embodiment the home BS for transmission of the configuration changes of the macro-network uses an installed terminal.

It is advantageous if on the network side the configuration of the geographic position of a base station that can be used by the cellular terminal is made available for retrieval by means of the cellular terminal. This can take place especially via a server or the like that can make contact via the land mobile network or that is integrated into the land mobile network.

Furthermore, the invention relates to a computer program product comprising a computer program that can run on a computer unit and that carries out the process according to the invention when it is executed on the computer unit of a base station.

Furthermore the invention relates to a corresponding base station, especially for execution of the process.

In the base station for making available network access to a cellular land mobile network for use by cellular terminals, especially a limited subscriber group, linking of the base station to the land mobile network taking place by cable, each cell of the land mobile network an identifier being sent and being able to be identified on this identifier, and the combination of the identifiers of the cell identifiers that can be received at a certain geographical position constituting a unique configuration, it is especially advantageous that the base station is set up to receive the identifiers of the cells of the land mobile network in range and to determine therefrom the configuration that corresponds to the geographical position of the base station, by means of the base station at regular time intervals the configuration being checked and when a modification of the identifier of one or more cells is established, from which a new configuration arises, the new configuration being determined and made available.

Preferably the base station has an integrated cellular terminal by means of which a new identifier of a cell and/or a new configuration is transmitted/can be transmitted to the cellular terminal that is cleared for use of the base station.

Geographical location as before means that using the configuration given at a certain position within the cellular land mobile network a conclusion about this geographical position is possible with the required reliability since this configuration occurs once within the land mobile network or however only occurs again in the network with a negligibly small probability.

The geographical position thus corresponds as indicated above to its vicinity in the transmission range and the current configuration designates that configuration that results from the identifiers of the cell identifiers that can be received at the current position.

BRIEF DESCRIPTION OF THE DRAWING

The invention is explained below with reference to figures in which.

SPECIFIC DESCRIPTION OF THE INVENTION

Figure 1:
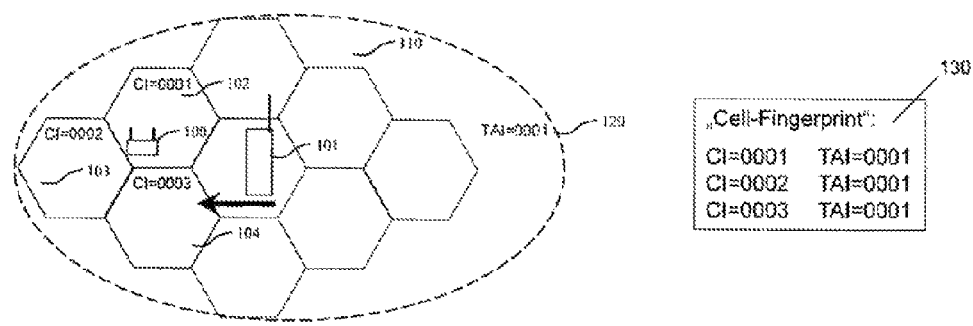
FIG. 1 shows a schematic of the location of a cellular terminal in a cellular land mobile network.

In the situation shown in FIG. 1, a cellular terminal 101 approaches the geographical position of its own base station, i.e. the home BS 100 and receives at this local position within the cellular land mobile network 101 information from several cells 102, 103, 104 of the macro-cell network, i.e. of the cellular land mobile network 110 as a "cell fingerprint" with the cell identity (CI) and Tracking Area Identity (TAI) in the case of E-UTRAN, in another case corresponding tracking area information such as the location area (LA) for UMTS or GSM).

The configuration 130 of this local geographical position that is stored in the cellular terminal resulting from the cell identifiers of the cells 102, 103, 104 can be determined therefrom. This configuration 130 identifies the corresponding geographical position within the land mobile network 110. When the stored configuration agrees with the current cell-constellation=configuration 130 a search for its own base station 100 is triggered, i.e. this is the trigger for the cellular terminal to search for the own home BS 100.

This invention devises network-side support of the search function of the cellular terminal 101 that enables the cellular terminal 101, in spite of changing the configuration 130 of the macro-cell network 110, i.e. of the cellular land mobile network 110, to implement an intelligent search function and when the macro-cell network 110 changes in the geographical vicinity of the location of the home BS 100 to still ensure reliably finding its own home BS 100.

The prerequisite for use of the proposed process according to the invention is the use of cell information of the cellular land mobile system 110 (i.e. of the macro-cells of the network) for intelligent support of the search function of the cellular terminal 101 for finding a certain base station 100. The major disadvantage of the prior art, that after changing the configuration 130 of the macro-cell network 110 in the vicinity of the location of the home BS 100 the search for the home BS 100 is not initiated because the "cell fingerprint" 130 used for the search is not found, is overcome hereby.

When a cellular terminal 101 for example in the geographical vicinity of its own home BS 100 has stored information from cells 102, 103, 104 of the macro-cell network 110 as the "cell fingerprint" 130 with cell identity (CI) and tracking area identity (TAI) (irTthe case of E-UTRAN, otherwise the corresponding tracking area information such as the location area (LA) for UMTS or GSM) and/or the resulting complete network configuration 130 of this geographic position, a cell constellation such as illustrated below would be the trigger for the cellular terminal 101 to search for its own home BS-100:

Typical "cell fingerprint" 130 in the vicinity of its own home BS 100:

| | |
|---|---|
| CI = 00001 | TAI = 00001 |
| CI = 00002 | TAI = 00001 |
| CI = 00003 | TAI = 00001 |
| CI = 00004 | TAI = 00001 |
| CI = 00005 | TAI = 00002 |
| CI = 00006 | TAI = 00002 |

This takes place automatically in the situation shown schematically in FIG. 1 when the cellular terminal 101 approaches the current local position of the base station 100.

This process is based on the statistical probability that within the cellular land mobile system 110 (PLMN—public land mobile network) this cell constellation 130 is one-time (or there is at least a very low probability of again finding exactly the same constellation 130 at another geographical position within the land mobile network 110).

When the macro-cell constellation changes (for example changing of a single cell ID of one of the cells 102, 103, 104 in the vicinity, whose identifiers can be received, i.e. that was used for the cell fingerprint 130), the cellular terminal 101 would however never find the cell constellation 130 used for searching and thus would not trigger a search for the home BS 100 either.

If for example the cell ID of cell no. 00004 (cell 104) is changed to 00010, a cellular terminal 101 that uses the original cell fingerprint 130 (see above) would not initiate the search for the corresponding home BS 100.

Change of the cell (cell ID) of the original "cell fingerprint":

| | |
|---|---|
| CI = 00001 | TAI = 00001 |
| CI = 00002 | TAI = 00001 |
| CI = 00003 | TAI = 00001 |
| CI → 00010 | TAI = 00001 |
| CI = 00005 | TAI = 00002 |
| CI = 00006 | TAI = 00002 |

In order to avoid the disadvantage of outdated stored "cell fingerprints" 130 and caused thereby the failure to find the home base station 100, the home base station 100 is arranged such that the base station 100 itself recognizes configuration changes of the macro-cell network 110 such as the cell identity (cell Id) or tracking area identity (TAI) or the like of the macro-cell 102, 103, 104 and communicates these changes to the cellular terminal 101, i.e. the altered cell identity and/or the resulting new configuration 140.

The base station 100 thus regularly checks the current configuration 140 of the network at the local position and optionally communicates changes to the cellular terminal 101. Thus, the cellular terminal 101 is able to update the stored "cell fingerprint", i.e. to store the new configuration 140 without itself remaining in the coverage area of the home base station 100. Another advantage of the invention is that the update of the 'cell fingerprint' 140 is carried out in a short time, conversely in the prior art configuration changes were detected only by way of periodic searching and had to be manually changed. The establishment and transmission of a change of the configuration 140 are shown in FIG. 2.

Figure 2:
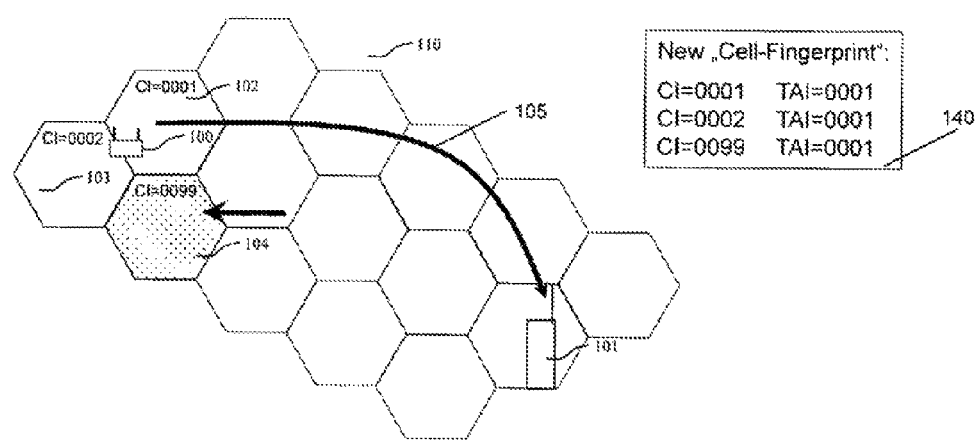
FIG. 2 shows a schematic of establishing and communicating a change of a cell identification CI with the result of an altered configuration.

As shown in FIG. 2 the base station 100 (HNB) recognizes the changes that have been undertaken in the public land mobile network and generates a message 105 for example in the form of a short message SMS (short message service) to registered users of the base station 100 (HNB). The altered cell fingerprint 140 (i.e. the cell identifier), i.e. the altered identity of a cell and/or tracking area identity, is communicated and/or the configuration 140 that is new as a result of a change containing all locally receivable cell identifiers (cell fingerprint) is transmitted. In the example shown in FIG. 2 the generated message 105 contains the complete configuration 140 from all locally received and evaluated cell identifiers (cell fingerprint).

With the altered new configuration 140 (new cell fingerprint) reliable searching of the home base station 100 is possible. It is proposed that the home base station 100 relay configuration changes in the macro-network 110 only to the terminals 101 and users who may use the home base station 100.

For recognition of configuration changes of the macro-network by the home base station 100 the home base station 100 is set up to automatically service its vicinity lists and for this purpose to regularly check the configuration 140 of the macro-network 110. For this purpose the home base station 100 is equipped with a cellular receiver. Information about the changes of the macro-network 110 in the region of the home base station 100 can be transmitted for example via SMS or other data channels to the cellular terminals 101 of the users of the home base station 100. For this purpose it is necessary to store the subscriber numbers (MSISDN) of the users of the home base station 100 in the home base station 100.

Instead of direct transmission of altered macro-network configurations from the home base station to the registered users of this home base station by means of SMS or by way of data channels, a storage solution in the network can also be used alternatively or cumulatively. In this approach that is not shown the cell fingerprint for the home base stations is stored on a server in the macro-network. The stored cell fingerprint is updated by the home base station if necessary and is periodically interrogated by the terminal of the home base station user. The advantage of this approach is that the home base station users need not be stored in the home base station.

The possible configuration changes of the macro-network that influence the cell fingerprint are diverse. Simple individual changes such as changes of the cell identity CI, tracking area identity TAI, frequencies, physical indicators and the like can be recognized by the base station and transmitted to the terminals by way of simple change messages. In this way the accuracy of the stored configuration (cell fingerprint) would not change. Larger changes such as repeated changes of existing macro-cells, new carriers or even new macro-cells cannot be communicated via change messages. For this purpose the home base station must generate a completely new cell fingerprint and transmit it to the users of the home base stations.

The invention claimed is:

1. A process for determining geographical location of a cellular terminal within a cellular land mobile network for finding a home base station, each cell of the cellular land mobile network being able to be identified by an identifier which is broadcasted by each cell, wherein the combination of the identifiers of cells that can be received at a certain geographical position constitutes a unique configuration, the geographical position of the home base station having such a unique configuration, the cellular terminal being configured to receiving and processing these identifiers and to storing one or more identifiers or configurations, and wherein the cellular terminal searches for the home base station if the cell identifiers that can be received by the cellular terminal at its current position matches the configuration stored in the cellular terminal, the process comprising the steps of determining at the home base station at regular time intervals the configuration of identifiers of cells that are received at the geographical position of the home base station and recognizing a change of the cell identity of a cell of the cellular land mobile network, and if the identifier of one or more cells is changed and the change constitutes a new configuration or identifier, transmitting the new identifier or the new configuration in the form of a short message or text message or over a data channel to the cellular terminal by a cellular terminal integrated into the home base station, and storing the new identifier or the new configuration in the cellular terminal.

2. The process defined in claim 1, further comprising the steps of:

transmitting the new identifier of a cell or the new configuration at the geographical position of the home base station to the cellular land mobile network by the home base station, and making available or transmitting the new configuration by the cellular land mobile network to the cellular terminal.

3. The process defined in claim 1, wherein the identifier of a cell has a cell identification and a tracking area identification.

4. The process defined in claim 1, wherein the identifiers transmitted to the cellular terminal or the transmitted configuration has additional geographical information.

5. The process defined in claim 1, further comprising the step of:

making available by the cellular land mobile network the configuration of the geographical position of the home base station that can be used by the cellular terminal for retrieval by the cellular terminal.

6. A home base station making available network access to a cellular land mobile network for cellular terminals, the home base station being accessible by a cellular terminal of a limited subscriber group, and linking of the home base station to the cellular land mobile network can take place by cable, each cell of the cellular land mobile network being able to be identified by an identifier that is broadcast by each cell, the combination of the identifiers of cells receivable at a certain geographical position constituting a unique configuration, the home base station comprising:

means for receiving the identifiers of cells of the cellular land mobile network in range;

means for determining therefrom at regular time intervals the configuration that corresponds to the geographical position of the home base station;

means recognizing a change of the cell identity of a cell of the cellular land mobile network;

means for determining a new configuration or identifier if the identifier of one or more cells has been changed and the change constitutes a new configuration or identifier; and a cellular terminal integrated into the home base station and configured for transmitting the new identifier or the new configuration to the cellular terminal in the form of a short message or text message or over a data channel.

* * * * *